_United States Patent Office_

3,634,359
Patented Jan. 11, 1972

3,634,359
PROCESS FOR THE MANUFACTURE OF HIGH-MOLECULAR WEIGHT POLYESTERS
Siegfried Breitschaft, Augsburg, and Rolf Holtermann, Ottmarshausen, Germany, assignors to Farbwerke Hoechst Aktiengesellschaft vormals Meister Lucius & Bruning, Frankfurt am Main, Germany
No Drawing. Filed Oct. 15, 1969, Ser. No. 866,736
Int. Cl. C08g 17/003
U.S. Cl. 260—75 M          5 Claims

ABSTRACT OF THE DISCLOSURE

High-molecular weight polyesters are obtained from low-molecular weight polyesters by after-condensation in the solid phase. High-frequency is used for heating up the polyester to the after-condensation temperature. During heating crystallization and substantial drying should take place.

---

The present invention relates to a process for the manufacture of high-molecular weight polyesters.

It is known that linear polyesters of dicarboxylic acids (or their esters with low molecular weight monovalent alcohols) and diols, of which particularly polyethylene terephthalate is of high practical importance, are synthesized by condensation in the melt.

The molecular weights thereby obtainable together with the properties of those polyesters meet the requirements for a wide field of application.

However, fields of application for polyesters have become known which require higher molecular weights than those obtained in the melt condensation as a result of increasing reactions of decomposition with a rising degree of condensation. For the manufacture of such high-molecular weight polyesters another method must be chosen which consists in that the melt condensation is interrupted before reactions of decomposition take place to an appreciable extent, the polyester is allowed to solidify and the condensation is then continued in the solid phase. This process is carried out in a manner such that the polyester is heated to temperatures of from 10° C. to 60° C. below its softening point in the form of granules, powder, or foils and is then maintained in this range of temperature in the inert gas stream or in vacuo until the high-molecular weight desired is obtained. It is very important for the duration of the total operation of the thermal after-treatment as well as for the quality of the polyester so treated that the material is rapidly and uniformly heated up to condensation temperature.

Polyesters are polar materials—and it is known that polar substances or substances containing high amounts of water can be heated and possibly dried in the electric alternating field within a very short time and therefore it would be possible to carry out the thermal after-treatment of low-molecular weight polyesters by means of high-frequency. This method of rapidly heating up polyethylene terephthalate is, however, impeded by the amorphous state of the latter owing to its mode of preparation and its water content. The moisture would lead to a considerably hydrolytic decomposition at elevated temperatures while the amorphous state of the material would involve deliquescence far below the crystallite melting temperature. Moreover, the presence of oxygen leads to oxydative damages in spite of the short time of heating up. For these reasons, the polyester provided for the after-condensation have till now been dried and crystallized in conventional manner and only for the very phase of after-condensation treated in a field of high-frequency. In this mode of operation it is rather difficult however exactly to control the temperature in the field of high-frequency over a prolonged period.

The present invention provides a process for the preparation of high-molecular weight polyesters, especially of high-molecular weight polyethylene terephthalate, by condensing corresponding low molecular weight polyesters in the solid phase, which comprises heating the low molecular weight polyesters to condensation temperature by means of high frequency in the presence of a streaming dry gas according to a determined temperature schedule, this heating process being carried out in a manner such that the polyester used is crystallized and almost dried until the condensation temperature is reached and then the very after-condensation is carried out in a field-free zone in known manner in the inert gas stream or in vacuo.

For the process in accordance with the invention it is important that, depending on the nature of the starting material, care must be taken that the range of temperature in which crystallization takes place with optimum speed is not exceeded before the polyester has adapted the crystallite form which is distinguished by a higher softening temperature by carefully regulating the heating process either with the aid of several pairs of electrodes, occasionally switching off the field and that the water set free during the heating process is instantly withdrawn from the polyester in order to maintain the hydrolytic decomposition within tolerable limits. When, after having reached the temperature necessary for condensation which is generally 10° C. to 60° C. under the crystallite melting point, the material is subjected to after-condensation in known manner in vacuo or in the hot inert gas stream in an apparatus independent of the high-frequency heater and kept at condensation temperature in this phase.

The mode of operation of the invention is generally carried out in practice in a manner such that the amorphous material is either slowly heated to condensation temperature, that is within 5 to 15 minutes by suitably choosing the field density in the inert gas stream, in which case it may be adavntageous to keep the material moving in this phase, for example by shaking it, or it is heated as rapidly as possible to 100° C. to 180° C., preferably 120° C. to 160° C., in the high-frequency field in the air or inert gas stream and then maintained in the field-free space at the temperature reached until the polyester is sufficiently crystallized. Only thereafter it is heated to the desired condensation temperature of about 200° C. to 250° C. Also in this case it is recommended to keep the material moving during the phase of drying and crystallization. After-condensation then takes place at the said temperature in the field-free space in known manner as already mentioned. The alterations which appear in the transparency of the polyester clearly show how the polyester turns from the amorphous to the crystalline state.

The process of the invention allows to transform low-molecular-weight polyesters into high-molecular weight polyesters—as they are needed, for example, for injection moulding—in an elegant, rapid and uncomplicated way. However, the said process is not limited to this class of substances but can be used for all condensable polymers, for example, polyamides, polyimides, polyureas with consideration of the properties of each product.

The following examples serve to illustrate the invention, the progress of condensation being measured as the specific viscosity $\eta$ spec. with solutions of 500 milligrams of polyester in 50 milliliters of a 3:2 mixture of phenol and tetrachlorethane.

EXAMPLE 1

500 grams of granulated polyethylene terephthalate of the specific viscosity $\eta=0.85$ and having a content of moisture of about 0.4% were heated to 125° C. within 3 minutes 45 seconds in a high-frequency field in a nitrogen stream. After a 5 minutes pause the field was again switched on until the product had reached 240° C. The η spec. value was then 0.817. The hot material was then subjected to an after-condensation in a N₂-stream of 240° C. to reach a η spec. value of 1.48 within 12 hours.

EXAMPLE 2

In a vacuum drying cabinet a polyester material of the same type as described in Example 1 was heated at 125° C. for 5 minutes 30 seconds in the high-frequency field in a N₂-stream. After a 5 minutes pause the temperature was raised to 240° C. with the aid of high-frequency. The η spec. value was then 0.835. After a 12 hours after-condensation the η spec. value was 1.49.

The example shows that in spite of pre-drying, the difference between the condensation degree of the product obtained and that of the product according to Example 1 is insignificant.

EXAMPLE 3

Undried, granulated polyethylene terephthalate of a spec. value of 0.88 and a content of moisture of 0.4% was heated to 240° C. within 5 minutes in the high-frequency field. While being heated no gas stream was passing through the material. The specific viscosity was reduced to 0.75. Furthermore, the material was melted together to a clump.

The example shows the results obtained by too quickly heating and the lack of carrier gas to remove the water set free.

EXAMPLE 4

Over a continuously operating dosing device polyester granules were applied in uniform packing on the belt of a high-frequency dryer with 2 electrodes. The belt was adjusted to such a speed that the polyester was heated to a temperature of 160° C. when passing the first high-frequency field. In the second following field the material was heated to the condensation temperature of 240° C. The distance between the two pairs of electrodes was only just so large that the polyester had enough time for the crystallization before entering the field of the second pair of electrodes.

The water set free was constantly removed from the polyester packing by pre-heated inert gas.

The hot granules were then continuously condensed in known manner in the solid phase in a reactor independent of the high-frequency apparatus until a viscosity η spec. of 1.5 was obtained.

EXAMPLE 5

Over a dosing device as described in Example 4 a high-frequency dryer was charged with polyester granules. While being heated to 160° C. dry air was passing through the polyester packing.

The polyester was kept in a field-free zone until the crystallization was completed. Then, in a second high-frequency dryer the material was further heated to the condensation temperature of 240° C. while dry inert gas was streaming through the packing. The further mode of operation was carried out as described in Example 4.

What is claimed is:

1. In the process for the preparation of a high-molecular weight polyethylene terephthalate by after-condensing the corresponding low-molecular weight polyester in the solid phase the improvement which comprises heating the low-molecular weight polyester to condensation temperature by means of high-frequency in the presence of a streaming dry gas which rapidly removes the water separated from the polyester during heating, the heating being carried out in such a manner that the polyester is crystallized and substantially dried before the condensation temperature is reached and then subjecting the crystallized and substantially dried product resulting to after condensation in a field-free zone in the inert gas stream or in vacuo.

2. A process as claimed in claim 1, in which the temperature is controlled during the heating process in a manner such that the crystallization of the polyester is completed to a large extent before the range of temperature in which crystallization takes place with optimum speed is exceeded.

3. A process as claimed in claim 1, in which the low-molecular weight polyester is kept moving during crystallization and drying.

4. The process according to claim 1 wherein the low-molecular weight polyester is raised to the condensation temperature of from about 200 to 250° C. in from 5 to 15 minutes.

5. The process according to claim 1 wherein the low-molecular weight polyester is rapidly heated to a temperature of from 100 to 180° C. in a high frequency field in air or an inert gas stream, then crystallized in a field-free zone and thereafter heated to a condensation temperature of about 200 to 250° C. in the inert gas stream by means of high frequency before being subjected to after-condensation.

References Cited

UNITED STATES PATENTS

| | | | |
|---|---|---|---|
| 3,305,532 | 2/1967 | Middleburg et al. | 260—75 |
| 3,405,098 | 10/1968 | Heighton et al. | 260—75 |

OTHER REFERENCES

Encycl. Polym. Sci. Technol. 5, 2–8, 13, 16, 198–199 (1966).

Cable, Induction & Dielectric Heating, Reinhold, New York 1954 (pp. 513–17).

Kremnev et al., Elektron. Obrab. Mater. 1968, (1) 38–41 (Chem. Abstr. supplied).

MELVIN GOLDSTEIN, Primary Examiner

U.S. Cl. X.R.

260—75 T